United States Patent
Glotzbach

[11] Patent Number: 5,511,600
[45] Date of Patent: Apr. 30, 1996

[54] BEAD RING ASSEMBLY FOR VEHICLE TIRES INCLUDING FORM-MATCHED BEAD APEX

[75] Inventor: Klaus-Dieter Glotzbach, Maintal, Germany

[73] Assignee: SP Reifenwerke GmbH, Hanau, Germany

[21] Appl. No.: 209,625

[22] Filed: Mar. 14, 1994

[30] Foreign Application Priority Data

Mar. 16, 1993 [DE] Germany ............... 43 09 359.5

[51] Int. Cl.⁶ ............... B29D 30/48; B60C 15/04; B60C 15/06
[52] U.S. Cl. ............... 152/540; 152/451; 156/136
[58] Field of Search ............... 152/539–541; 245/1.5; 156/136, 135

[56] References Cited

U.S. PATENT DOCUMENTS

| | | |
|---|---|---|
| 4,163,683 | 8/1979 | Lammlein, Jr. ............... 156/136 |
| 4,180,116 | 12/1979 | Maiocchi . |
| 4,216,814 | 8/1980 | Grosch et al. . |
| 5,263,526 | 11/1993 | Oare et al. . |

OTHER PUBLICATIONS

Patent Abstracts of Japan, vol. 15, No. 113 (M–1094) 18 Mar. 1991 & JP–A–03 005 218.

*Primary Examiner*—Adrienne C. Johnstone
*Attorney, Agent, or Firm*—Birch, Stewart, Kolasch & Birch

[57] ABSTRACT

A bead ring arrangement for vehicle tires in which the wire layers of the wire bundle are wound from a single wire and the wire layer at the core apex side has fewer turns than the wire layer lying beneath it.

9 Claims, 4 Drawing Sheets

BEAD RING ASSEMBLY FOR VEHICLE TIRES INCLUDING FORM-MATCHED BEAD APEX

BACKGROUND OF THE INVENTION

The present invention relates to a bead ring assembly for vehicle tires comprising a ring-like rubberized wire bundle of several wire layers arranged above one another and a bead apex comprising an elastomeric material, arranged adjoining the wire bundle and extending in the direction of the side wall of the tire.

Bead ring assemblies of various kinds are generally known. In such assemblies the rings which are essentially non-extensible in the radial direction are so wound that several wires which lie alongside one another, and which have been combined by rubber material into a band-like strip, are wound into a ring with several wire layers disposed above one another. As a rule wires are used with a relatively small diameter, below 1 mm. Despite this small diameter of the wires the start and end of the winding have an unfavorable effect with respect to the non-uniformity of the tire, even with a corresponding mutual displacement of the beginning and end of the winding. Such bead rings are also known and wound so that the ring surface defined by the radially inwardly disposed wire layer extends slightly conically so that an adaptation can be achieved to the shape of the associated surface of the rim seat. In this way a uniform contact pressure is achieved when the tire is installed on a wheel rim. For bead ring assemblies formed in this way the danger exists that faulty installation of the bead ring takes place during tire manufacture and that the angle of inclination of the radially inwardly disposed wire layer does not extend in correspondence with the inclination of the associated surface of the bead seat but rather opposite thereto. This faulty installation of the bead ring is practically not recognizable in the finished tire but can however lead to the tire being provided with a faulty installed bead lifting from the surface of the rim seat in certain driving situations. A sudden pressure loss in the tire can thereby occur causing serious driving situations.

SUMMARY OF THE INVENTION

An object of the present invention is to design a bead ring assembly of the initially named kind in such a way that the effects resulting from the bead ring layout on the tire uniformity can be at least substantially reduced, in particular with a simultaneous reduction of the manufacturing costs, and in such a way that the danger of a faulty installation of bead rings into the respective tire is practically precluded by the bead ring layout.

This object is satisfied in accordance with the present invention essentially in that the wire bundle is wound from a single wire; in that the number of wire turns lying alongside one another is different in at least two of the wire layers arranged on top of one another; in that the number of adjacent wire turns in the wire layer adjacent the bead apex is less by at least one turn than the number in the wire layer lying directly beneath it; and in that the bead apex contacts the wires of both wire layers in a form-matched manner.

More preferably the number of adjacent wires is two turns less than the number in the wire layer lying directly below.

Through the winding of the wire bundle from a single wire, in particular from a rubberized single wire, the points of abutment susceptible to breakage which are present in customary bead rings, and which can have an unfavorable effect on tire uniformity, are avoided. Moreover, a wire of larger diameter can be used for the winding of the bead ring which leads to a notable reduction of cost and also to a desirable reduction in weight.

It is of particular significance that the bead ring winding is executed in such a way that the number of wire turns lying alongside one another in the wire layer adjacent the bead apex is less by at least one turn and preferably by two turns than the number of windings in the wire layer lying directly beneath it, with the bead apex then being simultaneously so executed that it essentially contacts both the accessible layers in a form-fitting manner. This leads to a situation in which, during installation of the bead ring arrangement, not only the layout of the wire layer at the bead apex side provides a criterion for the correct installation of the bead ring in the tire but rather the previously installed unit of the bead ring and the bead apex which have been put together in a certain manner can only be correctly built into the tire as a result of the forming of the bead apex. In this way the initially indicated dangers of faulty installation of the bead ring assembly with a conically extending inner surface are removed.

Particularly advantageous embodiments of the present invention are set forth in the subordinate claims.

BRIEF DESCRIPTION OF THE DRAWINGS

The present invention will now be explained in more detail with reference to exemplary embodiments and to the drawing, wherein.

DESCRIPTION OF THE PREFERRED EMBODIMENTS

Figure 1:
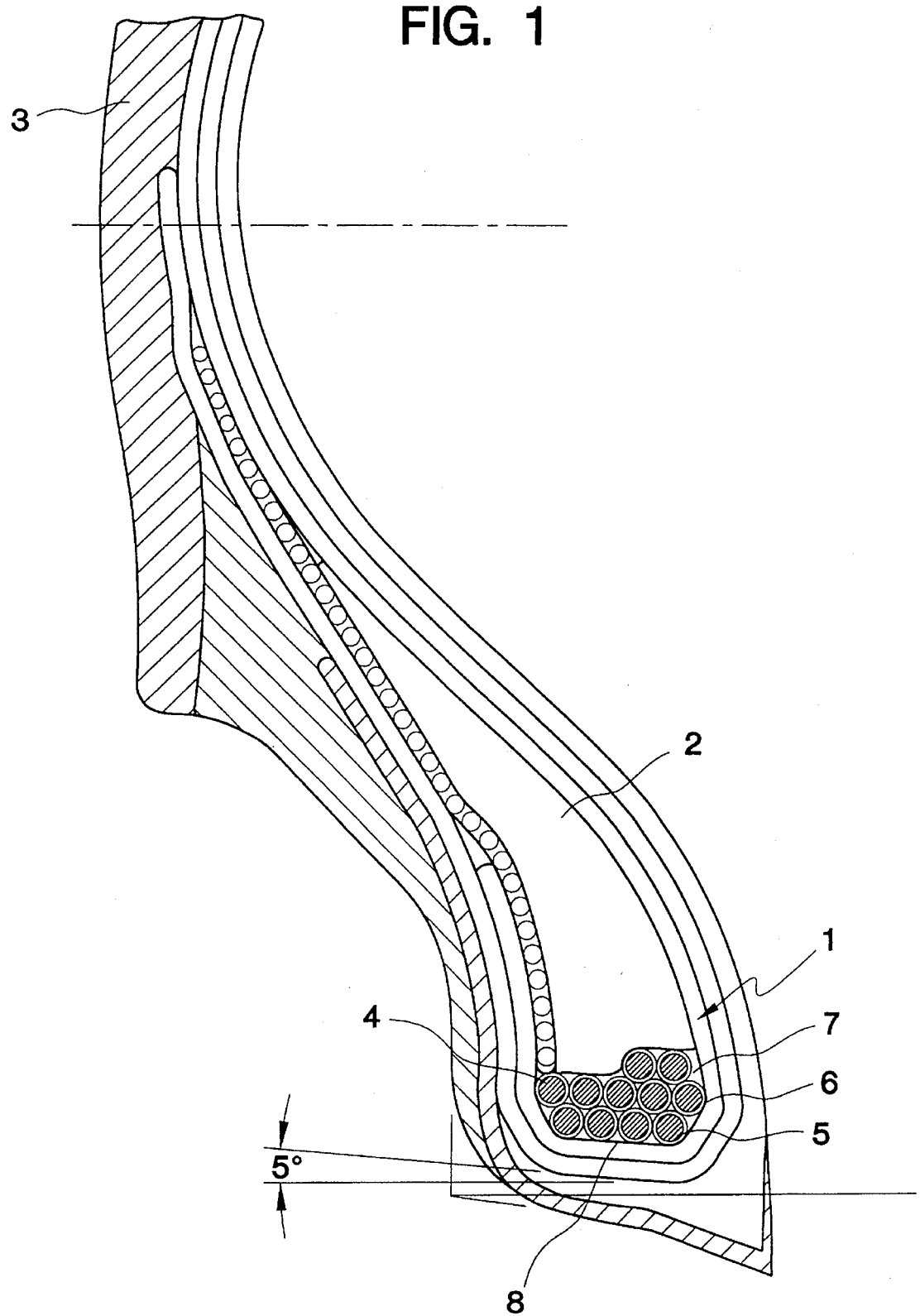
FIG. 1 is a schematic illustration of a bead ring region of a vehicle tire with a bead ring assembly formed in accordance with the present invention

FIG. 1 shows a bead region of a motor vehicle tire which comprises a bead ring formed from a wire bundle 1 with an associated bead apex extending from the bead ring in the direction of the sidewall 3.

The bead ring is wound from a single wire 4, in such a way that a lower wire layer 5, a middle wire layer 6 and an upper or bead apex side wire layer 7 is obtained. The wire bundle 1 formed in this way is embedded in a the customary manner in rubber compound and forms an essentially non-extensible ring.

The lower wire layer 5 consists of four windings or turns lying alongside one another, the middle wire layer 6 consists of five turns or windings lying alongside one another, and the wire layer 7 at the bead apex side consists of two turns or windings with the individual wire 4 being so wound that these two windings are positioned nearer the inside of the tire in the axial direction, thereby forming the wire bundle with a substantially hexagonal cross-section. (See also FIGS. 1–4.)

For the winding, a single wire is used with a diameter of greater than 1 mm, preferably in a range of larger than 1 to 1.5 mm, more preferably about 1.4 mm whereby it is possible to obtain, on the one hand, a savings of cost and, on the other hand, a savings of weight of 20%. The use of an individual wire having this wire thickness has no negative effects on tire uniformity since, as a result of the winding being a single wire, no point of abutment arises which extends over the full width of the bundle, as in customary wire bundles wound from a strip of parallel wires embedded in rubber. Instead only two single wire ends are present which can in turn be displaced relative to one another and are preferably disposed diametrically opposite to one another.

As the layout of the wire layer 7 at the bead apex side is in the form of only two windings a non-symmetrical assembly in cross-section results which makes it possible to recognize at once during the installation of the bead ring due to it being visible in the outer side of the bead ring. This is of substantial importance in bead rings which are so wound to match the rim seat surface with a conical ring surface 8. Such beads may have an inner surface which has for example an inclination of 5°. A bead ring formed in this way must be so built into the tire that this inclination extends in the same direction as the bead toe inclination, since only then is the required uniform contact pressure at the rim ensured. In the event of a faulty installation of the bead ring, i.e. an installation with the contrary inclination of the ring surface 8, extremely dangerous pairings of tires and rims can result so that it is of substantial importance to fundamentally preclude such faulty installations.

When the wire bundle 1 wound in accordance with the present invention is combined with the bead apex 2 into a sub assembly the wire bundle pack 1 and the bead apex 2 can only be combined or assembled in the correctly defined manner because of the stepped layout of the wire layer at the bead apex side, since the mutually oppositely disposed surface of the wire bundle 1 and the bead 2 are of complementary shape. As a result of the deformation of the bead apex one obtains in this manner an overall unit which precludes any form of faulty installation.

Figure 2:
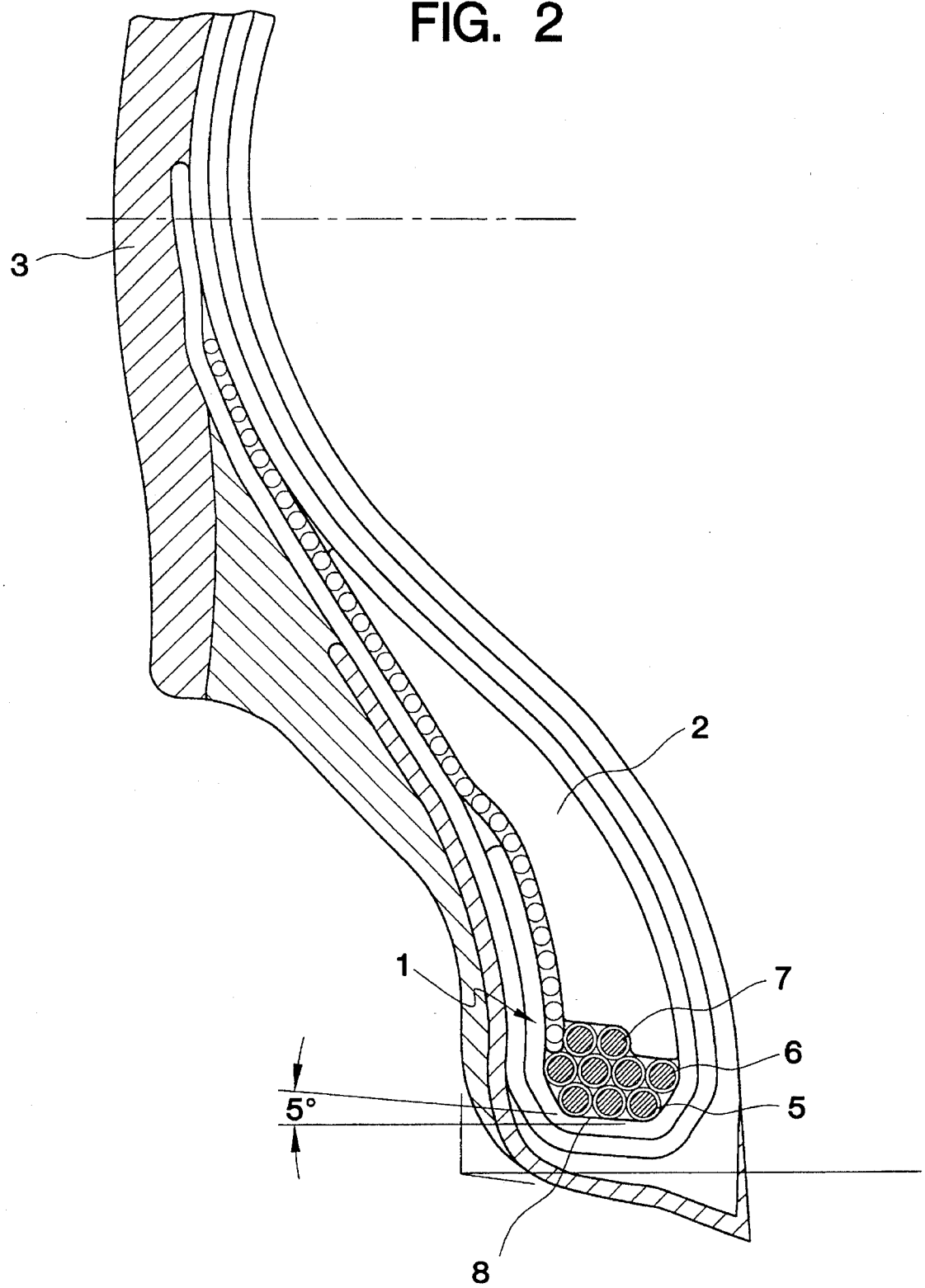
FIG. 2 is an illustration showing a modified embodiment of FIG. 1.

FIG. 2 shows a modification with the winding being so executed that the two windings of the layer 7 at the bead apex side are disposed at the axially outer side of the tire. Through the positioning of these windings at the bead apex side, which leads to a lack of symmetry in the layout of the wire bundle 1, the running behavior of the tire can be intentionally influenced. The illustration of FIG. 2 furthermore makes it clear that the principle of the bead core layout is realizable with a different number of turns per wire layer with the fundamental hexagonal structure however being retained.

Figure 3:
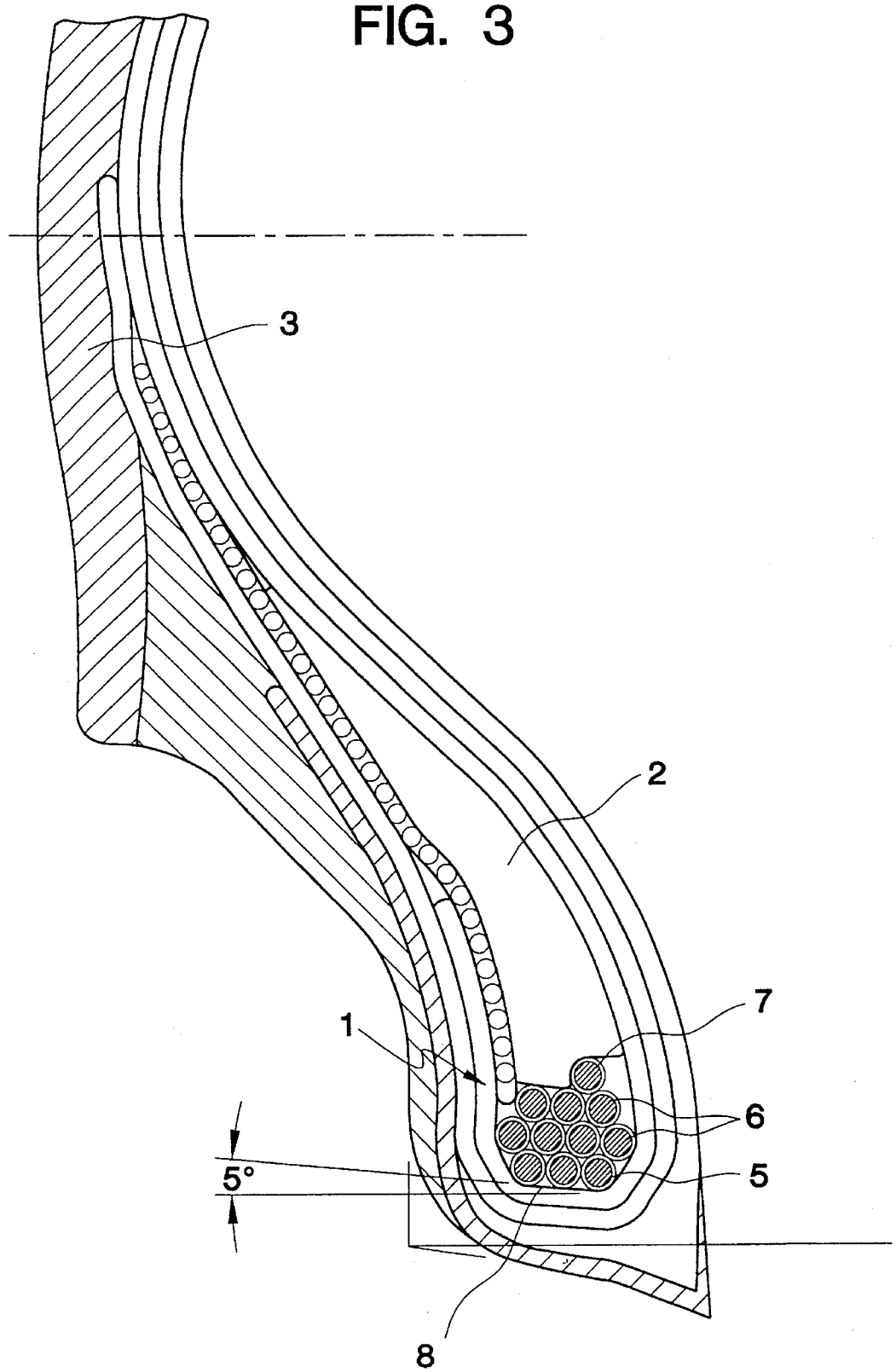
FIG. 3 is a schematic illustration of a bead region of a pneumatic vehicle tire with a further variant of the bead ring assembly in accordance with the present invention.

In the variant of FIG. 3 the winding is laid out in such a way that two middle wire layers 6 are formed between the lower wire layer 5, i.e. the radially inwardly disposed wire layer, and the layer 7 at the bead apex side which consists solely of one turn. The upper layer 7 consisting solely of a single turn is thereby disposed at the inner side of the tire and the bead apex 2 is again correspondingly adapted, shapewise and lies on the upper winding 7 and the layer 6 lying beneath it.

Figure 4:
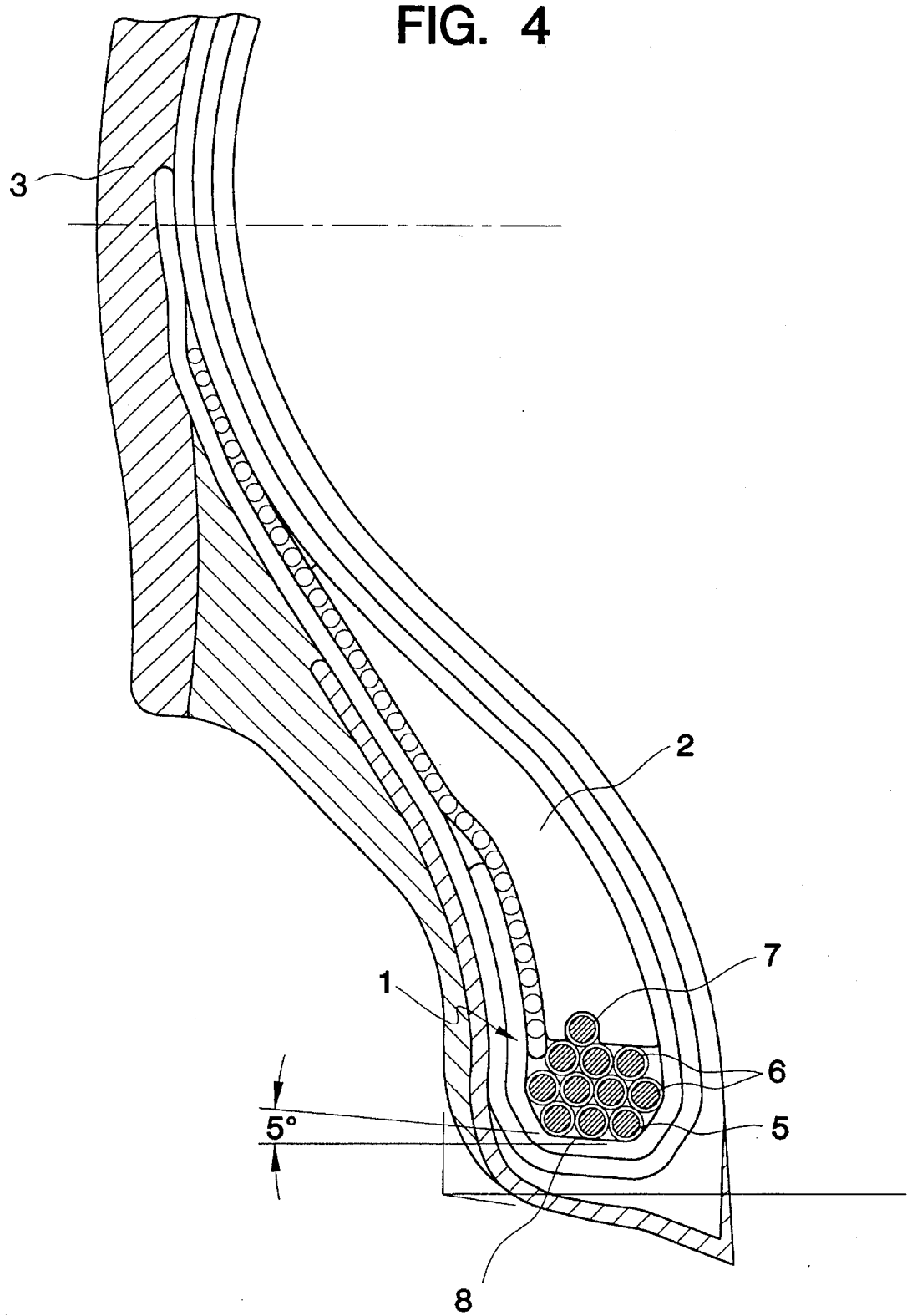
FIG. 4 is an illustration showing a modified bead ring assembly of FIG. 3.

FIG. 4 shows a variant of the embodiment of FIG. 3 in which the upper wire layer 7 consisting of a single winding or turn is disposed towards the outer side of the tire and is surrounded at both sides by the bead apex 2.

The advantages described above apply for all the illustrated variants.

Having now described my invention what I claim is:

1. A bead ring assembly for vehicle tires comprising a ring-shaped rubberized wire bundle consisting of several wire layers arranged on top of one another, and a bead apex comprising elastomeric material arranged adjacent the wire bundle and adapted to extend in the direction of a side wall of a tire, wherein the wire bundle is wound from a single wire; the number of wire turns lying alongside each other is different in at least two of the wire layers which lie on top of one another; the number of wire turns lying alongside each other in the wire layer at the bead apex side is smaller, by at least two turns, than the number of wire turns lying alongside each other in the wire layer lying directly underneath it; and the bead apex lies on wire turns lying alongside each other of both the wire layer at the bead apex side and the wire layer lying directly underneath it in a form matched manner.

2. The bead ring assembly according to claim 1 wherein the diameter of the single wire is larger than 1 mm.

3. The bead ring assembly according to claim 1 wherein the diameter of the single wire is in the range of larger than 1 to 1.5 mm.

4. The bead ring assembly according to claim 1 wherein the wire bundle is constructed with a substantially hexagonal cross-section.

5. The bead ring assembly according to claim 1 wherein two wire turns are used for the wire layer at the bead apex side, and the two wire turns lie on the axial side intended to be disposed towards the inner wall of a tire, with the bead apex axially overlapping the two wire turns at one side.

6. The bead ring assembly according to claim 1 wherein a single wire turn is used for the wire layer at the bead apex side and the bead apex axially overlaps the wire turn on one side and contacts the underlying wire layer lying directly beneath the wire turn.

7. The bead ring assembly according to claim 6 wherein the bead apex axially overlaps both sides of the wire turn.

8. The bead ring assembly according to claim 1 wherein the ring area defined by the radially inwardly disposed wire layer tapers down conically in an axial direction, the ring area being adapted to taper in the direction of the inner side of the tire.

9. The bead ring assembly according to claim 8 wherein the angle of inclination of the ring area surface is approximately 5° relative to the axis of the bead ring assembly.

\* \* \* \* \*